United States Patent
Lee et al.

(10) Patent No.: US 8,716,948 B2
(45) Date of Patent: May 6, 2014

(54) DYNAMIC CONTROL OF POWER SWITCHING BIPOLAR JUNCTION TRANSISTOR

(75) Inventors: Andrew Kwok-Cheung Lee, Union City, CA (US); Chuanyang Wang, Cupertino, CA (US); Jiang Chen, Cupertino, CA (US); Liang Yan, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 151 days.

(21) Appl. No.: 13/419,317

(22) Filed: Mar. 13, 2012

(65) Prior Publication Data

US 2013/0241430 A1   Sep. 19, 2013

(51) Int. Cl.
*H05B 37/02*   (2006.01)
*G05B 24/02*   (2006.01)

(52) U.S. Cl.
USPC .............................. 315/224; 315/307; 315/308

(58) Field of Classification Search
USPC ........... 315/224, 297, 307, 308, 258; 323/349
See application file for complete search history.

(56) References Cited

U.S. PATENT DOCUMENTS

| | | | |
|---|---|---|---|
| 2008/0224636 A1* | 9/2008 | Melanson | 315/307 |
| 2010/0308742 A1* | 12/2010 | Melanson | 315/224 |

* cited by examiner

*Primary Examiner* — Daniel D Chang
(74) *Attorney, Agent, or Firm* — Fenwick & West LLP

(57) ABSTRACT

The embodiments disclosed herein describe the dynamic control of a switching power converter between different operation modes of the switching power converter. In one embodiment, the operation modes of the switching power converter include a switching mode and a linear mode. The switching power converter may be included in a LED lamp system according to one embodiment.

15 Claims, 6 Drawing Sheets

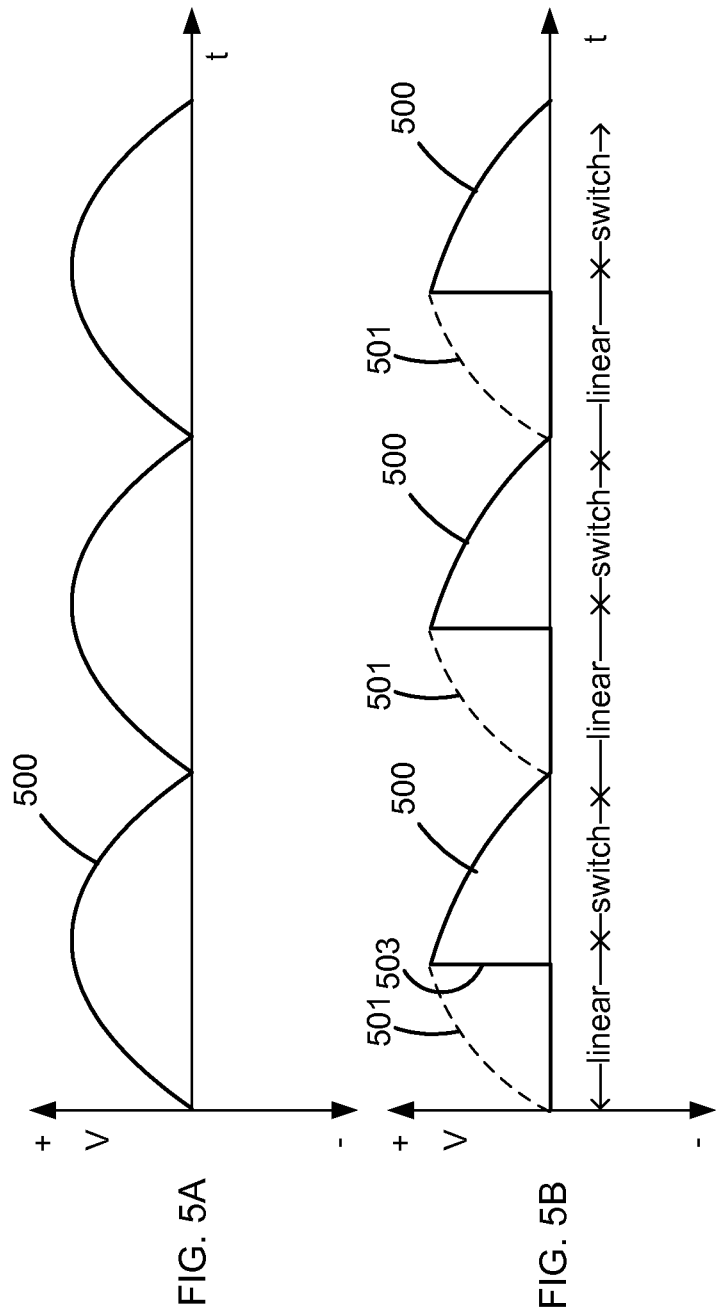

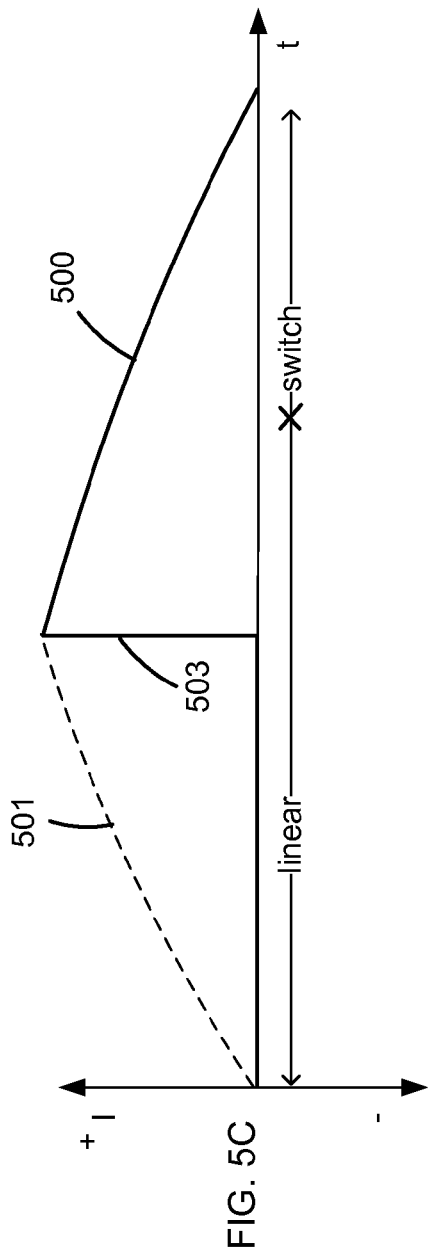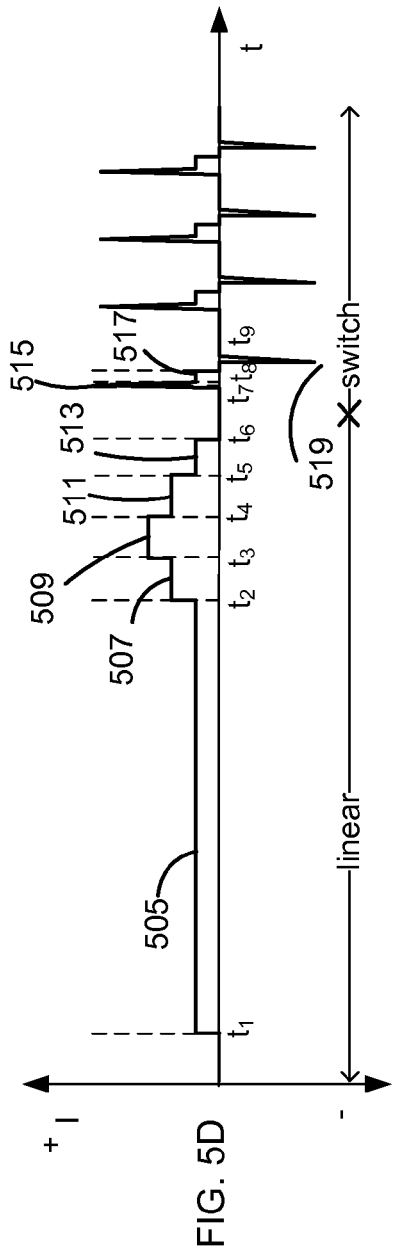

DYNAMIC CONTROL OF POWER SWITCHING BIPOLAR JUNCTION TRANSISTOR

BACKGROUND

1. Field of Technology

Embodiments disclosed herein relate generally to a switching power converter and more specifically to the dynamic driving of the switching transistor in a switching power converter.

2. Description of the Related Arts

Retrofit LED lamp systems are often designed and manufactured to operate with a conventional LED lamp used with a conventional phase-cut dimmer switch. The majority of the leading edge phase-cut dimmer switches adjust the lamp input voltage using a TRIAC circuit. A TRIAC is a bidirectional device that conducts current in either direction when it is triggered (i.e., turned on). Once triggered, the TRIAC continues to conduct until the current drops below a certain threshold, called a holding current threshold. For the internal timing of a TRIAC dimmer to function properly and for reducing the power consumption, current must be drawn from the dimmer at certain times at certain levels. Unfortunately, conventional LED lamps require multiple current control paths to draw current from the dimmer switch in a manner that allows the internal circuitry of the dimmer to function properly and minimize the power losses.

SUMMARY OF THE INVENTION

The embodiments disclosed herein describe the dynamic control of a switching power converter between different operation modes of the switching power converter. In one embodiment, the operation modes of the switching power converter include a switching mode and a linear mode. The switching power converter may be included in a LED lamp system according to one embodiment.

A bipolar junction transistor (BJT) may be used as the switching device in the switching power converter. A power controller controls whether the BJT operates in the cutoff mode, saturation mode, or active mode thereby causing the BJT to operate as an open circuit, a closed circuit, or a constant current sink based on the mode of operation. In one embodiment, the switching power converter operates in a "switching mode" when the BJT functions as a switch. Generally, the BJT operates as a switch when the controller toggles the BJT between the saturation mode and the cutoff mode. During the switching mode, the switching power converter provides direct current (DC) output voltage to a current regulator. The current regulator regulates current through LEDs of the LED lamp system to control the light output intensity of the LED lamp system.

In one embodiment, the switching power converter is operated in the "linear mode" when the BJT is operated in the active mode. When in the active mode, the BJT functions as a current sink. During the linear mode of the switching power converter, current from a dimmer switch included in the LED lamp system is drawn to the BJT to allow the internal circuitry of the dimmer switch to function properly. Furthermore, capacitors between the dimmer switch and the LED lamp in the LED lamp system are discharged because the current in the switching power converter is directed through the BJT functioning as a current sink. By discharging the capacitors, the switching power converter allows the internal circuitry of the dimmer switch to function properly. Furthermore, to overcome the dimmer parasitic oscillation, an adequate current can be drawn immediately after the dimmer phase-cut appears by operating the BJT as a current sink.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

FIGS. 5A, 5B, 5C, and 5D illustrate lamp input voltage waveforms and current waveforms of a drive transistor according to one embodiment.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe a method of a power controller that dynamically controls the operation of a switching power converter between a switching mode and a linear mode. In one embodiment, a BJT is used as the switching device (i.e., the drive transistor) in the switching power converter of an LED lamp system. A BJT operates in different modes of operation including the cutoff mode, saturation mode, or active mode. A BJT is configured to function as an open circuit, a closed circuit, or a constant current sink based the mode of operation of the BJT.

In one embodiment, the power controller controls the BJT to toggle between the saturation mode and the cutoff mode resulting in the BJT functioning as a switch. When the BJT operates as a switch, the switching power converter is operating in a "switching mode" according to one embodiment. During the switching mode, the switching power converter delivers electrical power to a load such as a string of LEDs. The controller further controls the BJT to operate in the active mode resulting in the BJT functioning as an adjustable current sink. When the BJT operates as a current sink, the switching power converter operates in a "linear mode" according to one embodiment. During the linear mode, current is drawn to the BJT thereby drawing current from a dimmer switch of the LED lamp system that sets the desired light output intensity of a LED lamp. Drawing current from the dimmer switch allows the internal circuitry of the dimmer switch to function properly. Furthermore, during the linear mode the BJT discharges capacitors formed between the LED lamp and the dimmer switch. Discharging the input capacitors allows the internal circuitry of the dimmer switch to function properly.

Figure 1:
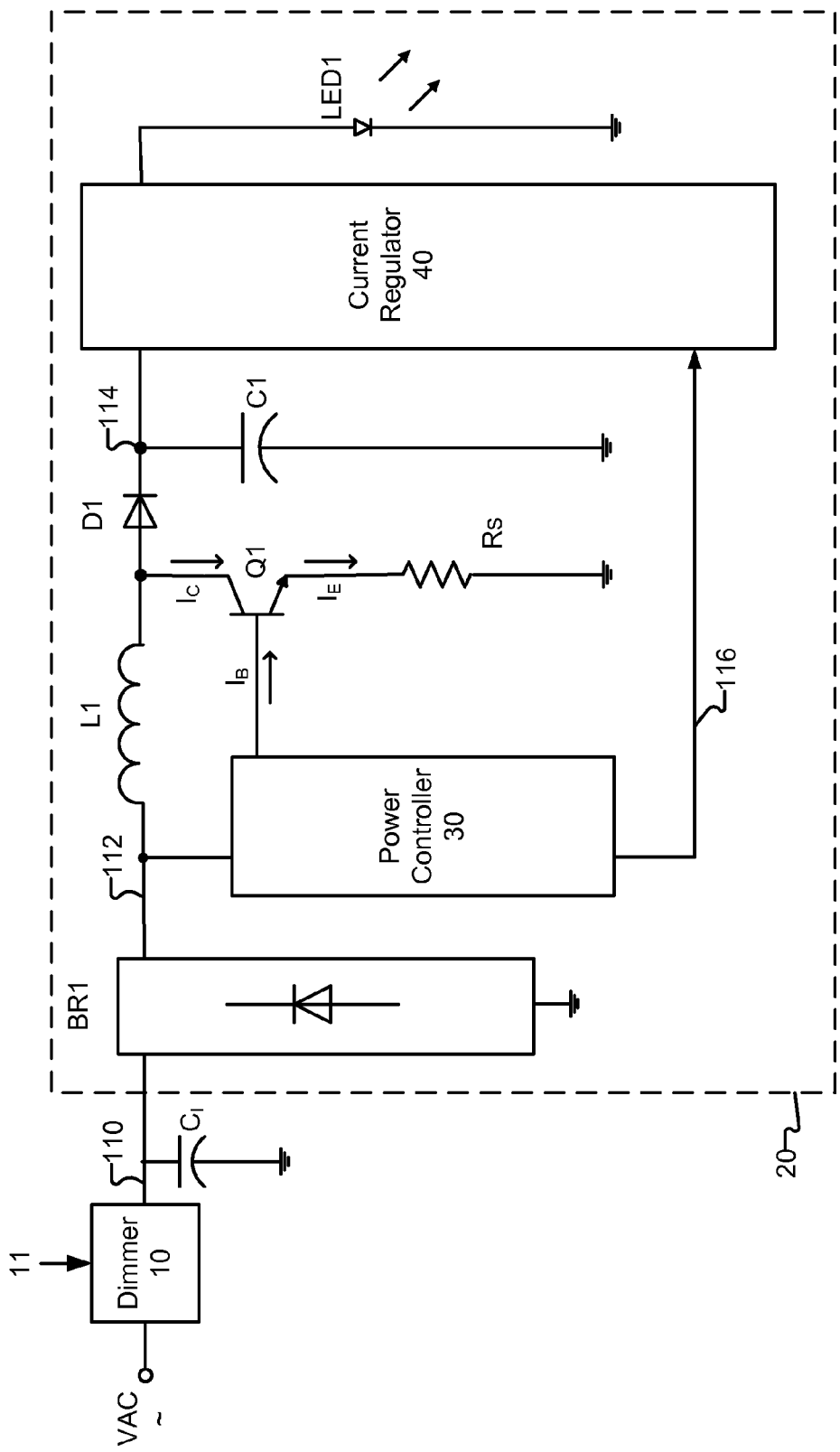
FIG. 1 illustrates a LED lamp system according to one embodiment.

FIG. 1 illustrates an LED lamp system including a dimmer switch 10 and a LED lamp 20. Capacitances $C_I$ are formed between the dimmer switch 10 and the LED lamp 20. In one embodiment, dimmer switch 10 is a conventional dimmer switch and receives a dimming input signal 11, which is used to set the target light output intensity of LED lamp 20. Dimmer switch 10 receives an AC input voltage signal VAC and adjusts the V-RMS value of the lamp input voltage 110 in response to dimming input signal 11. In other words, control of light intensity of LED lamp 20 by the dimmer switch 10 is achieved by adjusting the V-RMS value of the lamp input voltage 110 that is applied to LED lamp 20. Dimming input signal 11 can either be provided manually (via a knob or slider switch, not shown herein) or via an automated lighting control system (not shown herein).

One example of a dimmer switch is described in U.S. Pat. No. 7,936,132 which is incorporated by reference in its entirety. In one embodiment, dimmer switch 10 employs phase angle switching of the lamp input voltage 110 to adjust the lamp input voltage by using a TRIAC circuit. As previously described above, a TRIAC is a bidirectional device that can conduct current in either direction when it is triggered. For the internal timing of a TRIAC dimmer to function properly, current must be drawn from the dimmer 10 at certain times. In one embodiment, the LED lamp 20 is configured to draw current from the dimmer 10 in a manner that allows the internal circuitry of the dimmer 10 to function properly.

The LED lamp 20 includes a bridge rectifier BR1, an inductor L1, a diode D1, a capacitor C1, a drive transistor Q1, a sense resistor Rs, a power controller 30, a current regulator 40, and a light emitting diode LED1. Generally speaking, the LED lamp 20 employs a boost type switching AC-DC power converter comprised of inductor L1, diode D1, capacitor C1, and drive transistor Q1, using the drive transistor Q1 as the switching device driven by a dynamic switch drive signal. Drive transistor Q1 is a BJT in one embodiment. Note that in other embodiments other power converter topologies may be used for the power converter such as the flyback topology.

Specifically, the bridge rectifier BR1 receives the phase-angle adjusted AC voltage 110 and generates a rectified input voltage 112. The power controller 30 receives the rectified input voltage 112 and controls the base current $I_B$ to the drive transistor Q1 coupled to the power controller 30. Generally, the power controller 30 controls the boost converter shown in FIG. 1 that performs AC-DC voltage conversion.

The current regulator 40 receives the DC output voltage 114 from the power converter. The current regulator 40 also receives one or more control signals 116 from the power controller 30 and regulates current through the light emitting diode LED1 under the control of the control signals 116. Control signals 116 may include, for example, an indication of the phase-cut in the rectified input signal 112. Current regulator 40 may employ pulse-width-modulation (PWM) or constant current control to achieve the target light output intensity for the light emitting diode LED1. In one embodiment, current regulator 40 is a collection of components that uses a flyback topology to regulate current through the light emitting diode LED1.

In one embodiment, the power controller 30 controls whether the power converter is operating in the switching mode or in the linear mode based on the mode of operation of the drive transistor Q1. As described previously, the power converter operates in the switching mode when the drive transistor Q1 is operated in the saturation mode and the power converter operates in the linear mode when the drive transistor Q1 is operated in the active mode. In one embodiment, the mode of operation of the drive transistor Q1 is controlled by the power controller 30 by selecting whether a switching mode driver 203 or a linear mode driver 205 drives the drive transistor Q1 as shown in FIG. 2.

Figure 2:
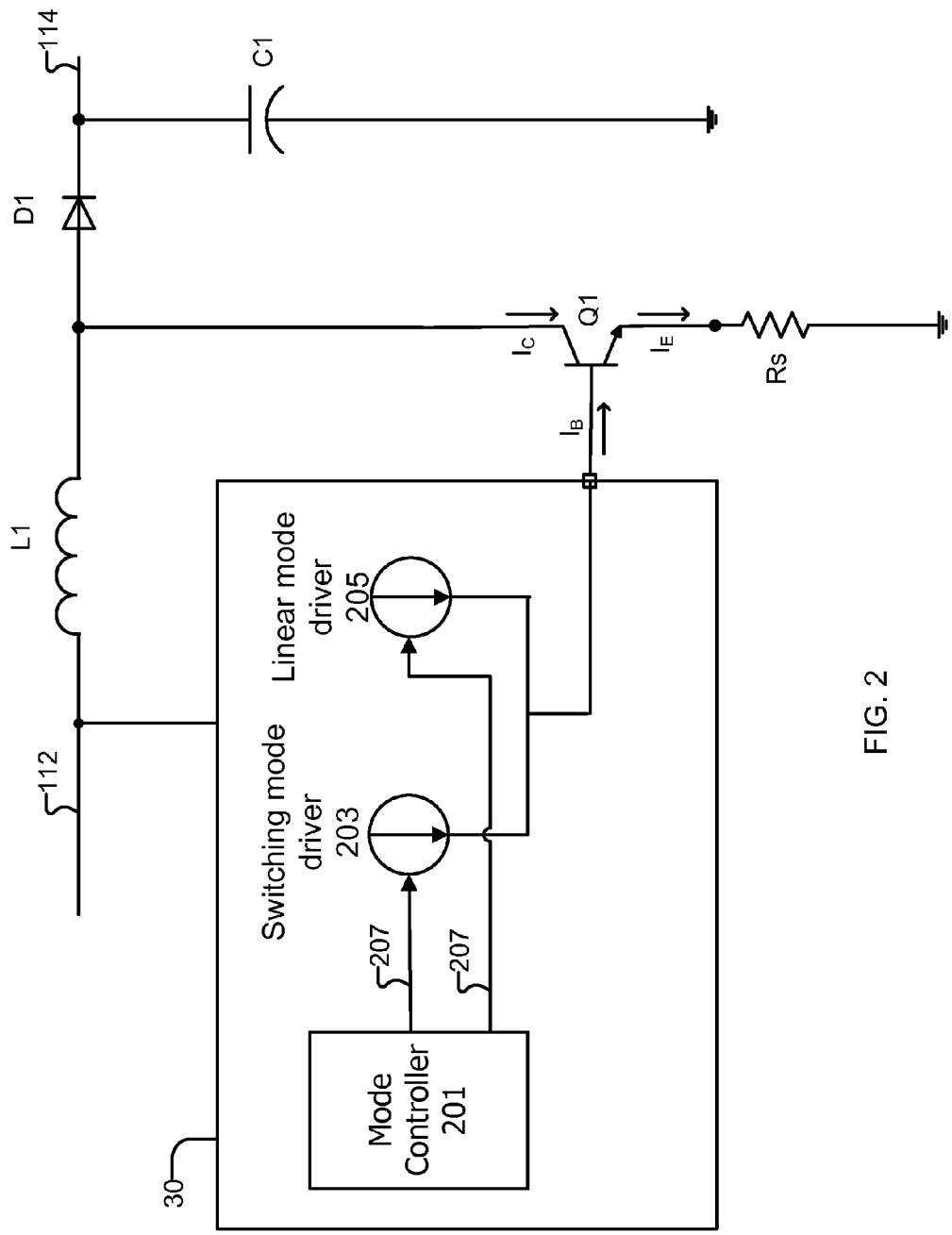
FIG. 2 illustrates a detailed view of a power controller according to one embodiment.

FIG. 2 illustrates a detailed view of the power controller 30 according to one embodiment. The power controller 30 comprises a mode controller 201, a switching mode driver 203, and a linear mode driver 205. The mode controller 201 selects whether the switching mode driver 203 or the linear mode driver 205 drives the base current $I_B$ of the drive transistor Q1 by sending a selection signal 207 to the switching mode driver 203 or the linear mode driver 205. If the mode controller 201 selects the switching mode driver 203 to drive the drive transistor Q1, the switching mode driver 203 supplies a range of current magnitude to the base of the drive transistor Q1 causing the drive transistor Q1 to operate in the saturation mode where the collector-emitter voltage is nearly zero.

As described previously, the drive transistor Q1 operates as a fully turned-on switch when in the saturation mode. The switching mode driver 203 supplies a large enough current to the base of the drive transistor Q1 to put the drive transistor Q1 deep into the saturation mode. Otherwise, a large collector-emitter voltage occurs resulting in efficiency loss of the switching power converter. In one embodiment, the range of current magnitude supplied by the switching mode driver 203 ranges from 7 mA to 93 mA. Other current ranges may be employed in different embodiments. The switching mode driver 203 may also supply current at discrete values within the aforementioned current range with step sizes ranging from 1 mA to 3 mA in one embodiment. Different step sizes may be used for different LED lamp systems of various power levels.

When the drive transistor Q1 is operated in the saturation mode (i.e., the drive transistor Q1 is turned on), current flows from the rectified input voltage 112 through the inductor L1 to the drive transistor Q1 to ground. The current flowing through the inductor L1 causes the inductor L1 to store energy. When the drive transistor Q1 is operated in the cutoff mode (i.e., the drive transistor Q1 is turned off), the energy stored in the inductor L1 flows through the diode D1 to the current regulator 40 that regulates current through the light emitting diode LED1.

If the mode controller 201 selects the linear mode driver 205 to drive the drive transistor Q1, the linear mode driver 205 supplies a range of current magnitude to the base of the drive transistor Q1 to operate the drive transistor Q1 in the active mode. In one embodiment, the range of current magnitude supplied by the linear mode driver 205 to the base of the drive transistor Q1 is lower than the current range supplied by the switching mode driver 203. The range of current magnitude supplied by the linear mode driver 205 ranges from 0.4 mA to 28 mA according to one embodiment. The linear mode driver 205 may also supply current at discrete values within the aforementioned current range with step sizes that are smaller than the step sizes provided by the switching mode driver 203. In one embodiment, the step size of current provided by the linear mode driver 205 ranges from 0.2 mA to 0.8 mA. The smaller step sizes may be used to finely control the drive transistor Q1 in the active mode without operating the drive transistor Q1 outside of its safe operating region. The current provided to the drive transistor Q1 may be increased during the linear mode to put the drive transistor deep in the active mode such that the collector-emitter voltage is maintained at a high voltage (e.g., roughly 500 V). The current supplied to the drive transistor Q1 may be increased until the unsafe operating limits of the drive transistor Q1 are reached.

When the drive transistor Q1 is in the active mode, the drive transistor Q1 operates as a current sink. Accordingly, current from the dimmer 10 is drawn to the drive transistor Q1 when the power converter is operated in the linear mode to allow the internal circuitry of the dimmer 10 to function properly. Furthermore, charges stored in capacitors $C_f$ formed between the dimmer 10 and the LED lamp 20 flows to the drive transistor Q1 thereby discharging the capacitors $C_f$. Discharging the capacitors $C_f$ allows the internal circuitry of the dimmer 10 to function properly.

If the base current $I_B$ supplied by the linear mode driver 205 is too high, the collector current $I_C$ of the drive transistor Q1 may rise high enough (i.e., to a threshold level) that the unsafe operating area of the drive transistor Q1 is approached. In response, the mode controller 201 may instruct the switching mode driver 203 to drive current to the drive transistor Q1 to put the drive transistor Q1 into the saturation mode or to lower the magnitude of current supplied to the base of the drive transistor Q1. Thus, the mode controller 201 accommodates the conduction and thermal limits of the drive transistor Q1 by providing a large range of adjustability of the current that may be supplied to the base of the drive transistor Q1.

Figure 3:
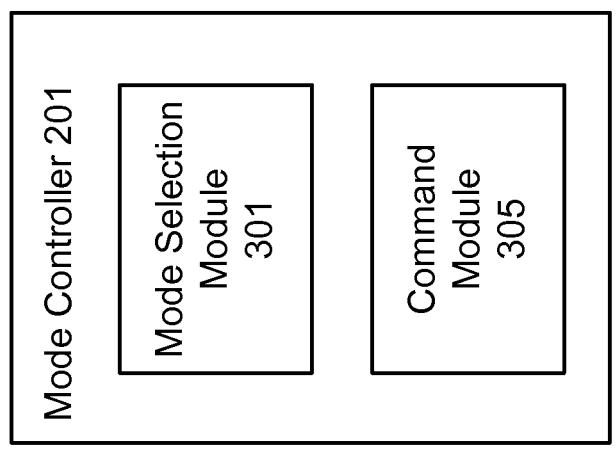
FIG. 3 illustrates a detailed view of a mode controller according to one embodiment.

Referring now to FIG. 3, one embodiment of a detailed view of the mode controller 201 is illustrated. In one embodiment, the mode controller 201 comprises a mode selection module 301 and a command module 305. As is known in the art, the term "module" refers to computer program logic or logic circuits utilized to provide the specified functionality. Thus, a module can be implemented in hardware, firmware, and/or software.

In one embodiment, the mode selection module 301 determines whether to operate the LED lamp 20 in the switching mode or the linear mode. The mode selection module 301 determines the mode of operation of the LED lamp 20 based on the rectified input voltage 112. The phase and magnitude of the rectified input voltage 112 indicates the dimmer output status. If the dimmer output indicates a high voltage, the high voltage signifies that the dimmer switch 10 is turned-on and the mode selection module 301 operates the power converter in the switching mode (i.e., the drive transistor Q1 is operated in the saturation mode). Conversely, if the dimmer output indicates a low voltage, the low voltage signifies that the dimmer switch 10 turned-off and the mode selection module 301 operates the power converter in the linear mode (i.e., the drive transistor Q1 is operated in the active mode). The mode selection module 301 communicates the selected mode to the command module 305.

In one embodiment, the command module 305 receives the mode selected by the mode selection module 301 and generates the selection signal 207 that instructs either the switching mode driver 203 or the linear mode driver 205 to drive the drive transistor Q1. In one embodiment, the selection signal 207 additionally indicates the magnitude of the current that the switching mode driver 203 or the linear mode driver 205 generates to drive the drive transistor Q1. In one embodiment, the magnitude of the base current is determined by the required collector current $I_C$. For example, if the required collector current $I_C$ is 200 mA and the drive transistor Q1 gain is 20, then the base drive current is set higher than 10 mA during the switching mode. Conversely, while in the linear mode, the base current is set to 10 mA.

Figure 4:
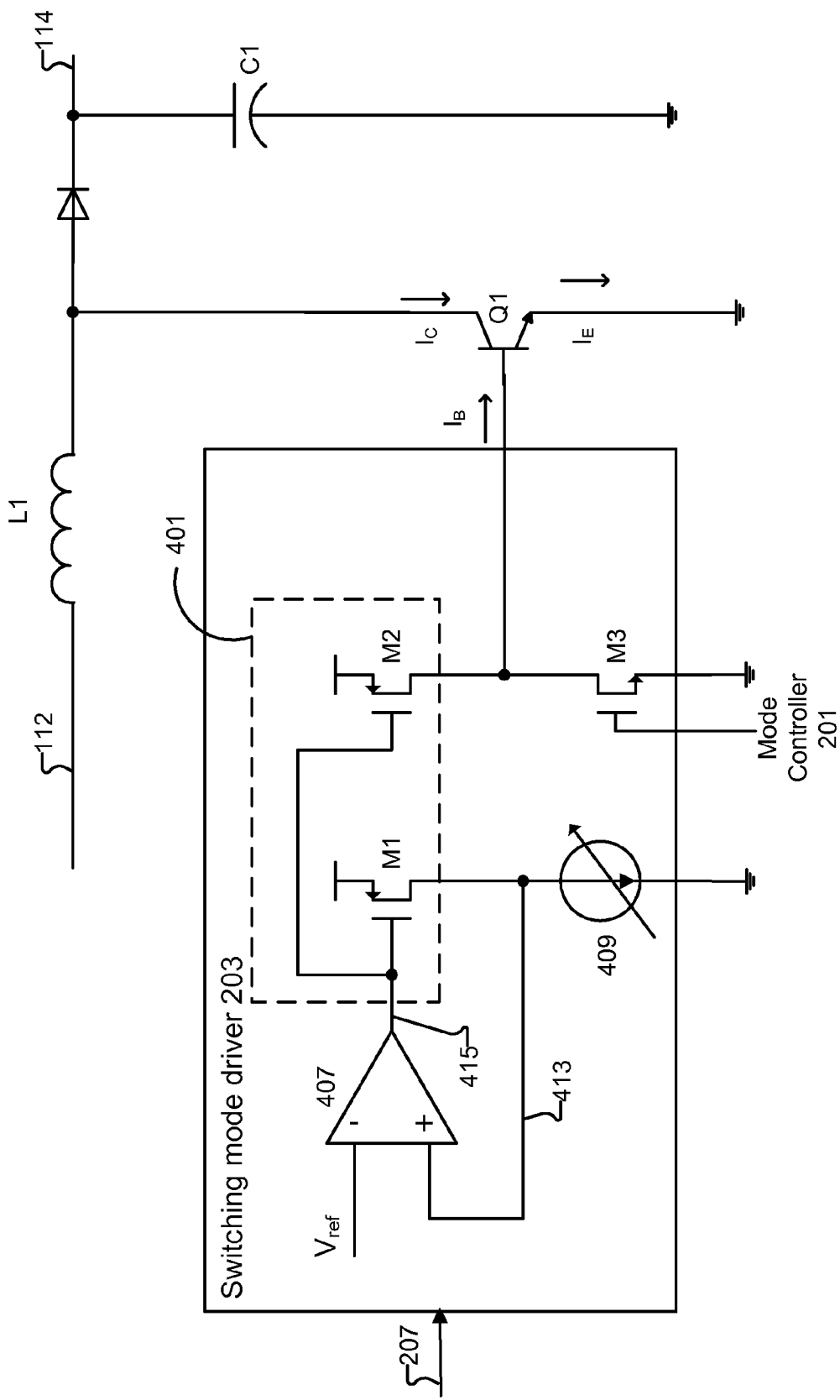
FIG. 4 illustrates a detailed view of a switching mode driver according to one embodiment.

FIG. 4 illustrates a detailed view of the switching mode driver 203 according to one embodiment. The switching mode driver 203 comprises a current mirror 401, an operational amplifier 407, an adjustable current source 409, and a metal-oxide-semiconductor field-effect transistor M3 (mosfet) according to one embodiment. The operational amplifier 407 turns on or turns off the current mirror 401 that generates the current used to drive the base of the drive transistor Q1. The operational amplifier 407 compares a voltage reference $V_{ref}$ with a voltage 413 at the drain of mosfet M1 included in the current mirror 401. When the voltage 413 input to the operational amplifier 407 is greater than the voltage reference $V_{ref}$, the operational amplifier 407 outputs a signal 415 to the gate of the P-type mosfet M1 and the gate of the P-type mosfet M2 that are included in the current mirror 401. The signal 415 sent by the operational amplifier 407 turns on mosfet M1 and mosfet M2 included in the current mirror 401 causing the generation of current that is supplied to the base the drive transistor Q1. The gate of mosfet M3 is coupled to the mode controller 201. The mode controller 201 turns off mosfet M3 which is a N-type mosfet that is used to quickly discharge the drive transistor Q1 when the drive transistor Q1 is turned off as will be further described below.

Note that although only two mosfets are shown in the current mirror 401, any number of mosfets may be used to adjust the magnitude of the current supplied to the base of the drive transistor Q1. The switching mode driver 203 adjusts the magnitude of the current provided to the base of the drive transistor Q1 based on the ratio of the current mirror 401 (i.e., the number of mosfets included in the current mirror 401) and the magnitude of the current generated by the adjustable current source 409. The current generated by the adjustable current source 409 is the reference current of the current mirror 401. The ratio of the current mirror 401 determines the amplification factor of the reference current set by the adjustable current source 409. In other words, the ratio of the current mirror 401 and the magnitude of the reference current determine the magnitude of the current that is provided to the base of the drive transistor Q1.

Furthermore, the ratio of the current mirror 401 determines the step size of current magnitude that is provided to the base of the drive transistor Q1 since the current mirror 401 amplifies the reference current set by the adjustable current source 409. Thus, if the reference current is adjusted from a first reference current to a larger second reference current, the ratio of the current mirror 401 determines the larger current magnitude supplied to the base of the drive transistor Q1 resulting from the amplification of the second reference current. Furthermore, the number of current mirrors used by the switching mode driver 203 determines whether the step size is fine or granular since each current mirror may be associated with a different amplification factor.

Note that a similar circuit may be used for the linear mode driver 205 and is omitted for ease of description. However, the ratio of the current mirror and the reference current used by the linear mode driver 205 may be different than the switching mode driver 203 to implement the different current range and different current steps sizes of the linear mode driver 205 compared to the switching mode driver 203.

When the input voltage set by the adjustable current source 409 is less than the voltage reference $V_{ref}$, the operational amplifier 407 sends a signal 415 that turns off the P-type mosfet M1 and P-type mosfet M2 that are included in the current mirror 401 and turns on N-type mosfet M3. Because the base of the drive transistor Q1 is no longer receiving current, the drive transistor Q1 turns off. N-type mosfet M3 is turned on by the mode controller 201 when the drive transistor Q1 turns off to provide a discharge path to quickly turn off the drive transistor Q1.

Referring to FIG. 5A, the AC voltage input into the dimmer switch 10 is illustrated. If the dimmer switch 10 is set to maximum light intensity, the AC voltage signal 500 from the input voltage source is unaffected by the dimmer switch 10. Thus, the lamp input voltage 110 is similar to the AC voltage signal 500 shown in FIG. 5A. FIG. 5B illustrates lamp input voltage 110 with a slight dimming effect as the dimmer switch 10 eliminates partial sections 501 of the AC voltage signal inputted into the dimmer switch 10. As shown in FIG. 5B, the LED lamp system cycles between the linear mode and the switching mode previously described above. During the linear mode, the power controller 30 operates the drive transistor Q1 in its active mode by precisely controlling the base current $I_B$ to the drive transistor Q1. During the switching mode, the power controller 30 operates the drive transistor Q1 in its saturation mode by switching the drive transistor Q1 on and off.

The linear modes and switching modes do not line up exactly with the phase cut 503. Instead, the linear mode extends past the phase cut 503 for a small amount of time until the power controller 30 switches to the switching mode. Due the sudden change in the rectified input voltage 112 caused by the phase cut 503, adjusting the base current $I_B$ in response to the phase cut 503 would be difficult if the power controller 30 operates with closed loop feedback (closed loop systems are slower). However, because the power controller 30 operates as an open loop, it can quickly adjust the base current $I_B$ to account for any sudden changes in the rectified input voltage 112, such as the phase cut 503.

FIG. 5C illustrates a detailed view of rectified input voltage 112 to the LED lamp 20 with the slight dimming effect and FIG. 5D illustrates a detailed view of the current supplied to the base of the drive transistor Q1 during the linear mode and the switching mode. Particularly, FIG. 5D illustrates how the power controller 30 adjusts the base current of the drive transistor Q1 to cause the drive transistor Q1 to operate in either the active mode or the saturation mode which is the bases of the LED lamp 20 operating in either the linear mode or the switching mode. Note that the current magnitudes illustrated in FIG. 5D are not to scale. As shown in FIG. 5D, the magnitude, duration, and step size of the current provided to the base of the drive transistor Q1 vary significantly during the linear mode and the switching mode however they may not be vary significantly in other embodiments.

During the linear mode, the varying current magnitude supplied to the base of the drive transistor Q1 as shown in FIG. 5D causes the drive transistor Q1 to operate in the active mode. As previously described above, during the active mode, the drive transistor Q1 functions as a current sink. Thus, during the linear mode shown in FIG. 5D, current is drawn from the dimmer switch 10 to the drive transistor Q1 to allow the internal circuitry of the dimmer switch 10 to function properly.

At time $t_1$, current supplied to the base of the drive transistor Q1 is increased to a first current magnitude 505 thereby placing the switching power converter in the linear mode because the drive transistor Q1 is operated in the active mode. The first current magnitude 505 is provided to the drive transistor Q1 to operate the drive transistor Q1 in the active mode until time $t_2$. After the phase cut 503, the current supplied to the drive transistor Q1 is calibrated to determine the current to supply to the drive transistor Q1 in the linear mode of the next AC cycle. Generally, from time $t_2$ to time $t_6$, different value levels of current magnitude are provided to the drive transistor Q1 to identify which current magnitude will be used to drive the drive transistor Q1 during the linear mode of the next AC cycle. Note that the current magnitudes provided from time $t_2$ to time $t_6$ cause the drive transistor Q1 to continue operating in the active mode.

At time $t_2$, the current supplied to the base of the BJT switch 209 is increased to a second current magnitude 507 which keeps the drive transistor Q1 in the active mode. At time $t_3$, the current supplied to the base of the drive transistor Q1 is increased to a third current magnitude 509 which may correspond to the peak current supplied to the drive transistor Q1 during the linear mode. The current supplied to the base of the drive transistor Q1 may increased until the safe operating limits of the drive transistor Q1 are approached in order to put the drive transistor Q1 deep in the active mode. At time $t_4$, the current supplied to the base of the drive transistor Q1 is decreased to a fourth current magnitude 511 and at time $t_5$ the current supplied to the base of the drive transistor Q1 is further decreased to a fifth current magnitude 513. The LED lamp 20 is still in the linear mode as the current supplied to the base of the drive transistor Q1 is adjusted from the fourth current magnitude 511 to the fifth current magnitude 513. Again, the current supplied to the base of the drive transistor Q1 is adjusted in order to calibrate the current that will be supplied to the drive transistor Q1 during the linear mode of the next AC cycle. At time $t_6$, current is not supplied to the base of the drive transistor Q1.

During the switching mode, the varying current magnitudes supplied to the base of the current supplied to the base of the drive transistor Q1 as shown in FIG. 5D causes the drive transistor Q1 to operate in the saturation mode. As previously described above, during the saturation mode, the drive transistor Q1 functions as a switch. Thus, during the switching mode shown in FIG. 5D, a DC output voltage 114 is provided to the current regulator 40 to power LED 1.

At time $t_7$, the current supplied to the base of the drive transistor Q1 is increased to a sixth current magnitude 515 which corresponds to the peak current supplied to the base of the drive transistor Q1 during the switching mode. The sixth current magnitude 515 supplied to the base of the drive transistor Q1 causes the drive transistor Q1 to operate in the saturation mode thereby causing the LED lamp 20 to operate in the switching mode. At time $t_8$, the current supplied to the base of the current supplied to the base of the drive transistor Q1 is decreased to a seventh current magnitude 517 which keeps the drive transistor Q1 in the saturation mode. At time $t_9$, the current supplied to the base of the drive transistor Q1 is decreased to an eighth current magnitude 519 causing the drive transistor Q1 to operate in the cutoff mode (i.e., off). Although the drive transistor Q1 is off, the LED lamp 20 is still operating in the switching mode. The current magnitude supplied to the drive transistor Q1 is further adjusted during the switching mode of the power converter as shown in FIG. 5D to supply power to LED1.

Upon reading this disclosure, those of skill in the art will appreciate still additional alternative designs for controlling the operation modes of power converters. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
a magnetic component coupled to an input voltage and to an output of the switching power converter;
a bipolar junction transistor (BJT) switch coupled to the magnetic component, current through the magnetic component being generated while the BJT switch is operating in a saturation mode and not being generated while the BJT switch is operating in a cutoff mode; and
a controller configured to generate a control signal to operate the BJT switch in the saturation mode, the cutoff mode, or an active mode;
wherein the switching power converter operates in a switching mode responsive to the BJT switch continuously switching operation between the saturation mode and the cutoff mode, the switching power converter delivering power to the output of the switching power converter during the switching mode;
wherein the switching power converter operates in a linear mode responsive to the BJT switch operating in the active mode, wherein the BJT switch is configured to draw current from a dimmer switch coupled to the switching power converter during the linear mode.

2. The switching power converter of claim 1, wherein input capacitors between the switching power converter and the dimmer switch are discharged via the BJT switch during the linear mode.

3. The switching power converter of claim 1, wherein the switching power converter is incorporated into a light emitting diode lamp.

4. The switching power converter of claim 1, further comprising:
a switching mode driver configured to generate a first range of current magnitude that drives a base terminal of the BJT switch responsive to receiving the control signal from the controller, the first range of current magnitude causing the BJT switch to operate in the saturation mode; and
a linear mode driver configured to generate a second range of current magnitude that drives the base terminal of the BJT switch responsive to receiving the control signal from the controller, the second range of current magnitude causing the BJT switch to operate in the active mode.

5. The switching power converter of claim 4, wherein a lower end of the first range of current magnitude is greater than at least a lower end of the second range of current magnitude, and a higher end of the first range of current magnitude is greater than at least a higher end of the second range of current magnitude.

6. The switching power converter of claim 4, wherein the switching mode driver is further configured to increase the current delivered to the base terminal of the BJT switch from a first current magnitude to a second current magnitude during the switching mode to keep the BJT switch in the saturation mode and wherein the linear mode driver is further configured to maintain the current delivered to the base terminal of the BJT switch at a third current magnitude to keep the BJT switch in the active mode.

7. The switching power converter of claim 6, wherein the linear mode driver is further configured to increase the current delivered to the base terminal of the BJT switch from the third current magnitude to a fourth current magnitude during the linear mode to determine a current magnitude to deliver to the base terminal of the BJT switch during the linear mode in a next AC cycle to keep the BJT switch in the active mode.

8. The switching power converter of claim 7, wherein a current step size from the first current magnitude to the second current magnitude during the switching mode is larger than the a current step size from the third current magnitude to the fourth current magnitude during the linear mode.

9. In a controller, a method of controlling a switching power converter, the switching power converter including a magnetic component coupled to an input voltage and to an output of the switching power converter and a bipolar junction transistor (BJT) switch coupled to the magnetic component, current through the magnetic component being generated while the BJT switch is operating in a saturation mode and not being generated while the BJT switch is operating in a cutoff mode, the method comprising:
generating a control signal to operate the BJT switch in the saturation mode, the cutoff mode, or an active mode;
operating the switching power converter in a switching mode with the BJT switch continuously switching operation between the saturation mode and the cutoff mode, the switching power converter delivering power to the output of the switching power converter during the switching mode; and
operating the switching power converter in a linear mode with the BJT switch operating in the active mode;
wherein the BJT switch is configured to draw current from a dimmer switch coupled to the switching power converter during the linear mode.

10. The method of claim 9, wherein input capacitors between the switching power converter and the dimmer switch are discharged via the BJT switch during the linear mode.

11. The method of claim 9, wherein the control signal controls a switching mode driver to generate a first range of current magnitude that drives a base terminal of the BJT switch to operate the BJT switch in the saturation mode responsive to the switching mode driver receiving the control signal and wherein the control signal controls a linear mode driver to generate a second range of current magnitude that drives the base terminal of the BJT switch to operate the BJT switch in the active mode responsive to the linear mode driver receiving the control signal.

12. The method of claim 11, wherein a lower end of the first range of current magnitude is greater than at least a lower end of the second range of current magnitude, and a higher end of the first range of current magnitude is greater than at least a higher end of the second range of current magnitude.

13. The method of claim 11, wherein the control signal controls the switching mode driver to increase the current delivered to the base terminal of the BJT switch from a first current magnitude to a second current magnitude during the switching mode to keep the BJT switch in the saturation mode and wherein the control signal controls the linear mode driver to maintain the current delivered to the base terminal of the BJT switch at a third current magnitude to keep the BJT switch in the active mode.

14. The method of claim 13, wherein the control signal further controls the linear mode driver to increase the current delivered to the base terminal of the BJT switch from the third current magnitude to a fourth magnitude during the linear mode to determine a current magnitude to deliver to the base terminal of the BJT switch during the linear mode in a next AC cycle to keep the BJT switch in the active mode.

15. The method of claim 14, wherein a current step size from the first current magnitude to the second current magnitude during the switching mode is larger than a current step size from the third current magnitude to the fourth current magnitude during the linear mode.

* * * * *